M. P. HOLMES.
TRUCK.
APPLICATION FILED DEC. 11, 1918. RENEWED FEB. 5, 1921.
1,378,819.
Patented May 17, 1921.
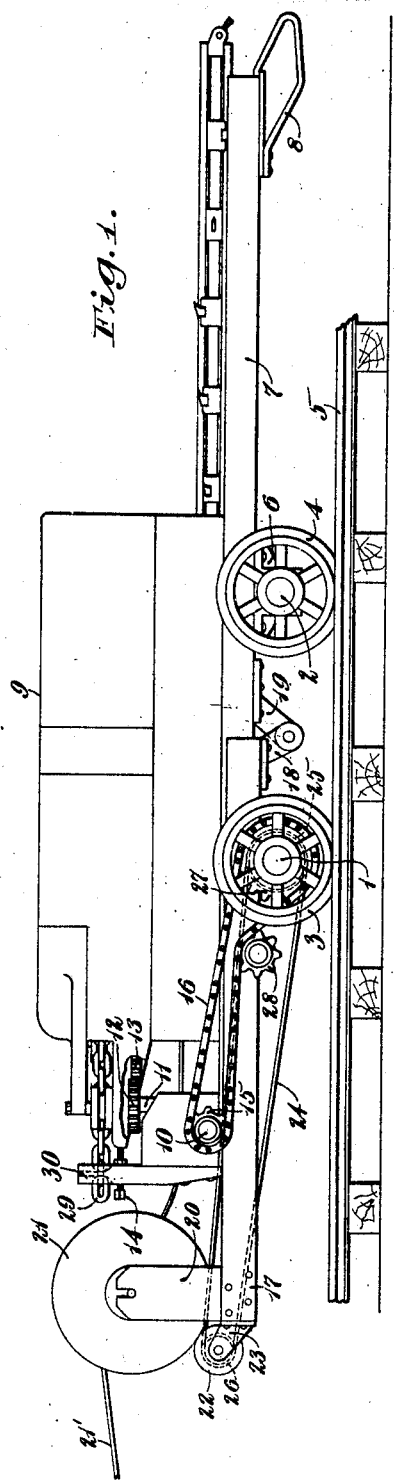
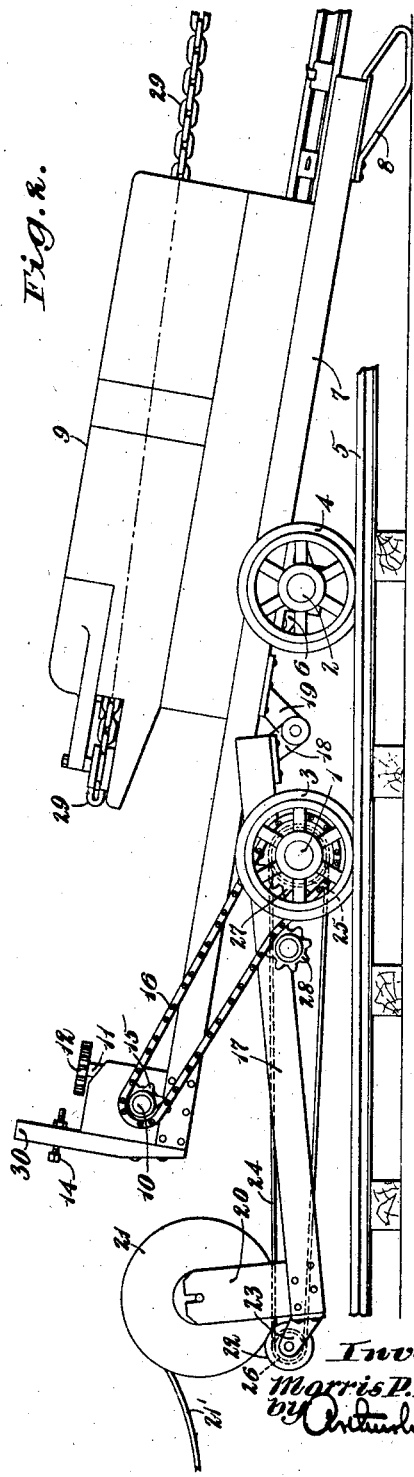
Inventor:
Morris P. Holmes.

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,378,819. Specification of Letters Patent. Patented May 17, 1921.

Application filed December 11, 1918, Serial No. 266,315. Renewed February 5, 1921. Serial No. 442,888.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks, and more particularly to mining machine trucks, the object of the present invention being to provide a counterbalanced, tilting, solid frame truck which will remain in a tilted position after the unloading of the mining machine, but which will be automatically returned to a horizontal position when the machine is loaded onto the truck.

This improved truck possesses the advantages of the solid frame trucks now in use in that the bed or main truck frame is solid and substantial, without having the disadvantages of that type of truck in which the rear wheels are raised from the track during the unloading operation and are permitted to fall on the track after the mining machine is unloaded, with a resulting breakage of car wheels, cable reel supports and, frequently, a derailing of the truck. These and other objects and advantages of my improved construction will hereinafter more fully appear.

In the accompanying drawings I have shown for purposes of illustration one embodiment which my invention may assume in practice.

In these drawings,—

Figure 1 is a side elevation of my improved truck with the mining machine thereon in loaded position.

Fig. 2 is a side elevation of the truck with the mining machine unloading therefrom.

Referring to the drawings, I have there shown, for the purpose of illustrating the principal features of the invention, a four-wheel truck having a plurality of axle members 1 and 2 carrying wheels 3 and 4 adapted to run on rails 5. The front axle 2 is journaled in an axle box 6 which is preferably securely attached to a rigid frame 7 in such a manner that this frame may be swung on the front axle as a pivot. As shown, this frame extends in front and rear of the two axles and is provided at its front end with a loading shoe 8, the latter being preferably formed of a forwardly extending reversed frame member which limits the swinging movement of the frame and functions as a loading skid to facilitate the loading of the mining machine 9 onto the truck frame.

At its rear end the frame is provided in a well known manner with a transverse driving shaft 10 and a substantially vertically disposed shaft 11, the latter being driven by the mining machine 9 through suitable spur gears 12, 13, and in turn driving the shaft 10 through a worm and worm gear, not shown. Suitable means, such as a set screw 14, is provided for limiting the movement of the mining machine onto the truck so as to prevent injury to the spur gears 12, 13 and to hold these gears in their proper spaced relation. The shaft 10 carries near one end thereof a driving wheel or sprocket 15 adapted to drive the truck, preferably through a flexible driving member, as a chain 16.

It will be noted that by this construction the main truck frame, which carries the truck driving mechanism and receives and supports the mining machine, is of a substantial nature and is rigid throughout, and that all parts thereof are so supported that they are not liable to become loosened or be broken during the unloading or loading operation or when the truck is being moved about the mine.

It is desirable in unloading trucks of this type that the loading frame shall tilt during the unloading or loading operation to permit the mining machine to run off onto the floor, or from the floor onto the truck, and it is also desirable that, after the mining machine has been unloaded, the frame shall remain in a tilted position, preferably in contact with the mine floor, as is shown in Fig. 2, so that it is ready for the loading operation. It is also essential to the long life of the truck that all the wheels remain on the track, and that some means be provided for permitting a tilting action of the frame in such a manner as to leave all the wheels on the track, and, further, that, after the machine has moved off the frame, the latter will be held in a tilted position.

For these purposes, in my improved construction, I have mounted the rear axle 1 on a separate frame 17, the latter being hingedly secured to the main frame 7 by two hinge members or elements 18, 19 respectively mounted on the supplemental frame member 17 and the main frame member 7. The hinge element 19 is preferably attached to the main frame member slightly in the rear of the front axle 2, and the axle 1 is attached to the supplemental frame member adjacent to but slightly in the rear of the hinge. Mounted on the opposite end of the small frame 17, between upright supports 20, carried upon each side of the frame is a cable reel or drum 21 bearing a cable 21' and adapted to pay out the cable as the machine travels toward the right and to reel in the cable as the machine is moved toward the left. To facilitate the reeling in of the cable, a friction wheel 22 is mounted on a bracket 23 on the end of the small frame member in such a manner that it bears against one of the drum heads and is adapted to drive this drum head through its frictional engagement therewith. The driving force for rotating the drum is transmitted to this friction wheel through a flexible member such as a chain 24 passing over a driving sprocket wheel 25 mounted on the axle 1, and a driven sprocket wheel 26 operatively connected with the friction wheel. As is apparent to those skilled in the art, when the mining machine is of the type driven by compressed air instead of by electricity, the winding drum or reel may receive a hose adapted to transmit compressed air to the mining machine.

In my improved construction the supplemental frame member is of such a length that the cable reel will nicely clear the rear end of the truck frame when the latter is swung to loaded position, as is shown in Fig. 1. Reels of the type illustrated weigh, in common practice, from two to three hundred pounds, according to the amount of cable wound on them, and this weight, taken with its leverage over the rear axle 1, is such that it will overbalance the main mining machine frame, which is pivotally supported by the front axle, and will retain the latter in a tilted position with the shoe 8 in contact with the mine floor when the mining machine is off of the truck. However, when the mining machine is moved onto the truck, and the center of gravity passes to the left of the front axle 2, the weight of the mining machine and truck will overbalance the moment of the reel and will force the rear end of the main frame down into contact with the supplemental frame so that the weight of the mining machine is borne by both axles.

In trucks of the jack-knife type, the main frame is split and the two ends dropped, one end touching the mine floor and the other the track. In such a construction, the reel supporting end of the truck strikes the rails, springing, if not breaking, the reel supports. In my improved construction I preferably so proportion the length of the small frame member and the distance between the hinge and the rear axle that when the shoe strikes the mine floor the reel supporting end of the supplemental frame member clears the tracks by several inches, thereby avoiding this danger.

To drive the truck about the mine, a driven sprocket 27 is mounted on the rear axle 1 and is connected by the chain 16, which passes over this sprocket, with the sprocket 15 mounted on the shaft 10. As will be obvious from a comparison of Figs. 1 and 2, as the rear end of the main frame moves toward or from loading position the distance between the driving and driven sprockets varies, with a resultant tensioning or slackening on the chain. If this chain were permitted to slacken to any appreciable extent it would be liable to jump one or the other of the sprockets or to whip and be broken. For the purpose of maintaining a constant tension on this chain, I have mounted an idler wheel or sprocket 28 on the auxiliary frame member slightly in the rear of the axle 1, the distance between this idler wheel and the axle being so proportioned to the distance between the driving and driven sprockets and the swinging movement of the two frames, that this idler wheel will compensate for the change in distances between these two sprockets and will keep a constant tension on the chain.

If desired, a factor of safety may be permitted in the counterbalancing action of the reel on the main frame, so that the main frame is not easily moved from an unloading to a loaded position, as would occur if tools were placed near the rear end of the main frame, or if a workman should sit on this end of the frame, the safety factor being such that under these conditions the frame will not move to a horizontal position but will remain in contact with the mine floor, as shown in Fig. 2. Since a mining machine weighs several thousand pounds, a large factor of safety may be permitted without changing the action of the truck as the mining machine moves off from or onto it. However, the moment of the reel about the axle 1 should not be made so great that it will tend to raise the rear end of the main frame and swing the latter about the shoe as a fulcrum and so raise the front wheels off the track 5.

From the foregoing it is clear that as the mining machine is moved off from the truck toward the right, the chain 29 being attached to a suitably placed fork for this purpose, the weight of the machine will tilt the solid frame from the position shown in Fig. 1 to the position shown in Fig. 2. After the machine has left the frame, the latter will remain in the position shown in Fig. 2, being supported by the wheels 3, 4, and the shoe.

When it is desired to reload the mining machine, the chain 29 is caught on a chain fork 30 at the rear of the main frame, and the mining machine is run under its own power onto the main frame until the spur gears mesh, the weight of the mining machine returning the truck to the position shown in Fig. 1, which is termed the loaded position.

By this improved construction it will be noted that the length of the mining machine truck is substantially the same as the length of the main truck frame, that a solid frame or bed is provided for the mining machine, that the driving connection between the rotatable member mounted on the frame and the truck driving wheels is at all times maintained intact, and that the reel and its support are utilized to counterbalance or control the main frame member in such a manner that the latter is normally held in a tilted position when the mining machine is unloaded from the truck.

While I have in this application specifically described one embodiment which my invention may assume in practice, it is to be understood that the same is shown for illustrative purposes only and that the invention may be modified to assume various other forms without departing from the spirit of the invention.

What I claim as new and desire to secure by Letters Patent is:

1. In a mining machine truck, a wheeled tiltable load carrying frame, a reel supporting counterbalancing member engaging said frame, and truck driving means mounted on said frame and adapted to be driven by a mining machine.

2. In a mining machine truck, a plurality of sets of wheels, a tiltable load carrying frame mounted on one set of wheels, a reel supporting counterbalancing member mounted on another set of wheels and engaging said frame, and truck driving means mounted on said frame and engaging one of said sets of wheels.

3. In a mining machine truck, a plurality of sets of wheels, a tiltable load carrying frame mounted on one set of wheels, a reel supporting counterbalancing member mounted on another set of wheels and engaging said frame, and truck driving means mounted on said frame and operatively connected with said last named set of wheels.

4. In a mining machine truck, a plurality of sets of wheels, a tiltable load carrying frame mounted on one set of wheels, a reel supporting counterbalancing member mounted on another set of wheels and engaging said frame, truck driving means mounted on said frame and including a flexible connection engaging said last named set of wheels, and means for maintaining a constant tension on said flexible connection.

5. In a mining machine truck, a plurality of sets of wheels, a tiltable load carrying frame mounted on one set of wheels, a reel supporting counterbalancing member mounted on another set of wheels and engaging said frame, truck driving means mounted on said frame and including a flexible connection engaging said last named set of wheels, and means for taking up the slack in said flexible connection.

6. In a mining machine truck, a plurality of sets of wheels, a tiltable load carrying frame mounted on one set of wheels, a reel supporting counterbalancing member mounted on another set of wheels and engaging said frame, truck driving means mounted on said frame and including a flexible connection engaging said last named set of wheels, and means mounted on said member for taking up the slack in said flexible connection.

7. In a mining machine truck, a wheeled tiltable load carrying frame, a reel supporting counterbalancing member engaging said frame, truck driving means mounted on said frame and adapted to be driven by a mining machine, and a reel rotating means mounted on said truck.

8. In a mining machine truck, a wheeled tiltable load carrying frame, a reel supporting counterbalancing member engaging said frame, truck driving means mounted on said frame and adapted to be driven by a mining machine, and a reel rotating means mounted on said member.

9. In a mining machine truck, a plurality of sets of wheels, a tiltable load carrying frame mounted on one set of wheels, a reel supporting counterbalancing member mounted on another set of wheels and engaging said frame, truck driving means mounted on said frame and engaging said last named set of wheels, and reel rotating means mounted on said member and adapted to be driven by said last named set of wheels.

10. In a mining machine truck, a large, wheeled, solid machine carrying frame, a smaller wheeled frame pivotally connected at its forward end to said large frame, a reel mounted on the rear end of said small frame, truck driving means mounted on said first mentioned frame, and a reel rotating means mounted on the smaller frame.

11. In a mining machine truck, a wheeled tiltable load carrying frame, a reel supporting wheeled counterbalancing member engaging said frame, truck driving means mounted on said frame and operatively connected to the wheels of one of said elements, and reel driving means carried on said member and operatively connected to the wheels of one of said elements.

12. In a mining machine truck, a wheeled tiltable load carrying frame, a reel supporting wheeled counterbalancing member engaging said frame, truck driving mechanism mounted on said frame and including a flexible connection operatively connected to the wheels of one of said elements, reel driving means carried on said member and operatively connected to the wheels of one of said elements, and means for taking up the slack in said flexible connection.

13. In a mining machine truck, a wheeled tiltable load carrying frame, a reel supporting wheeled counterbalancing member engaging said frame, truck driving mechanism mounted on said frame and including a flexible connection operatively connected to the wheels of said counterbalancing member, reel driving mechanism carried on said member and operatively connected to said wheels, and means on said member for taking up the slack in said flexible connection.

14. In a mining machine truck, a machine receiving unit having a wheeled axle thereunder about which said unit is adapted to pivot in tilting in a vertical plane, a tiltable wheeled unit disposed in rear of said machine receiving unit and tiltable to support the latter in tilted position, means pivotally connecting said second mentioned unit to the rearward end of said first mentioned unit, a reel carried on said second mentioned unit in rear of the axis thereof, and a mining machine driven shaft on one of said units having a direct driving connection with the wheels of said other unit.

15. In a mining machine truck, a machine receiving frame having a wheeled axle thereunder about which said frame is adapted to pivot in tilting in a vertical plane, a tiltable wheeled unit disposed in rear of said axle and tiltable on tilting of said frame into position to support the latter in tilted position, a reel carried on said unit, and truck driving mechanism carried by said frame.

16. In a mining machine truck, a tiltable truck unit including a truck frame, a single, wheeled supporting member therefor and truck driving mechanism, said frame being tiltable to loaded or unloading position by a mining machine movable thereover, and a wheeled counter-balancing truck unit hingedly connected to the first named truck unit at a point removed from the wheeled supporting member thereof comprising a wheeled frame, a reel supported thereby, and a reel rotating means mounted thereon.

17. In a mining machine truck, a tiltable truck unit including a truck frame, a single wheeled supporting member therefor and truck driving mechanism, said frame being tiltable to loaded or unloading position by a mining machine movable thereover, and a wheeled counter-balancing truck unit hingedly connected to the first named truck unit at a point removed from the wheeled supporting member of the latter and comprising a tiltable frame mounted on a single, wheeled supporting member, a reel supported by said last mentioned frame, and a reel rotating means mounted thereon, said counter-balancing unit being adapted to support one end of the first mentioned frame when the latter is loaded, and being adapted to normally retain the latter in an unloading position.

18. In a mining machine truck, a tiltable machine carrying frame element, a wheeled frame supporting truck element with respect to which said frame element makes an angle when in tilted position, a reel thereon, a shaft adapted to be driven by a mining machine on one of said elements, a flexible driving connection between said shaft and said other element, and means for preventing slack in said driving connection.

19. In a mining machine truck, a tiltable machine carrying frame element comprising a wheeled axle about which said element is adapted to tilt, a wheeled frame supporting truck element with respect to which said frame element makes an angle when in tilted position, a reel thereon, a mining machine driven shaft on one of said elements, a driving connection between said shaft and a wheel of said other element, and means on one of said elements for preventing slack in said driving connection.

20. In a mining machine truck, a wheeled truck unit comprising a tiltable bed, truck driving mechanism on said bed, and a wheeled counter-balancing unit engaging said bed to normally hold the latter in an inclined position.

21. In a mining machine truck, a wheeled truck unit comprising a tiltable bed, truck driving mechanism on said bed, and a wheeled reel supporting unit engaging said bed to normally hold the latter in an inclined position.

In testimony whereof I affix my signature.

MORRIS P. HOLMES.